United States Patent
Takemoto (10) Patent No.: US 7,251,357 B2
(45) Date of Patent: Jul. 31, 2007

(54) METHOD, APPARATUS AND RECORDING MEDIUM FOR SETTING BACKGROUND IMAGE

(75) Inventor: Fumito Takemoto, Kaisei-machi (JP)

(73) Assignee: Fujifilm Corporation, Minamiashigara-shi (JP)

(*) Notice: Subject to any disclaimer, the term of this patent is extended or adjusted under 35 U.S.C. 154(b) by 385 days.

(21) Appl. No.: 10/105,237

(22) Filed: Mar. 26, 2002

(65) Prior Publication Data

US 2002/0140981 A1  Oct. 3, 2002

(30) Foreign Application Priority Data

Mar. 29, 2001 (JP) ............... 2001-094614

(51) Int. Cl.
- *G06K 9/00* (2006.01)
- *G09G 5/00* (2006.01)
- *H04N 9/74* (2006.01)

(52) U.S. Cl. ............ 382/162; 345/635; 348/586
(58) Field of Classification Search .......... 382/162, 382/164, 190, 194, 305; 345/629, 635; 348/586, 348/587; 396/310, 311
See application file for complete search history.

(56) References Cited

U.S. PATENT DOCUMENTS

| | | | | |
|---|---|---|---|---|
| 5,140,348 A * | 8/1992 | Jamzadeh et al. | ...... | 347/115 |
| 5,229,837 A * | 7/1993 | Osakada | ...... | 356/240.1 |
| 5,504,884 A * | 4/1996 | Kyuma et al. | ...... | 707/5 |
| 5,767,920 A * | 6/1998 | Jo | ...... | 348/577 |
| 6,026,411 A * | 2/2000 | Delp | ...... | 707/104.1 |
| 6,128,396 A * | 10/2000 | Hasegawa et al. | ...... | 382/103 |
| 6,343,147 B2 | 1/2002 | Yamamoto | ...... | 382/167 |
| 6,445,396 B1 * | 9/2002 | Suzuki | ...... | 345/636 |
| 6,778,759 B1 * | 8/2004 | Yamada et al. | ...... | 386/95 |

FOREIGN PATENT DOCUMENTS

| | | | |
|---|---|---|---|
| GB | 2259214 A | * | 3/1993 |
| JP | 2000196933 A | * | 7/2000 |
| JP | 2000312242 A | * | 11/2000 |

OTHER PUBLICATIONS

English abstract of JP 2000196933 A.*
English abstract of JP 2000312242 A.*
Selected pages from Webster's II New Riverside University Dictionary.*

* cited by examiner

*Primary Examiner*—Matthew C. Bella
*Assistant Examiner*—Yubin Hung
(74) *Attorney, Agent, or Firm*—Birch, Stewart, Kolasch & Birch, LLP

(57) ABSTRACT

When a photograph album is generated by laying out images, a background image is set in accordance with the images. Image data sets representing the images are input to background setting means and area ratio calculation means calculates a ratio of an area where a chroma value is not smaller than a predetermined threshold value for an entire area of each image. Setting means finds a ratio of the image data sets whose area ratio is not smaller than a predetermined threshold value to all the image data sets, and sets the background color to white or beige if the ratio is small. If the ratio is large, a hue histogram is generated and the background color is set in accordance with a hue appearing with the largest frequency. Layout means arranges the images on the background to obtain album data. A printer prints the album data.

10 Claims, 9 Drawing Sheets

METHOD, APPARATUS AND RECORDING MEDIUM FOR SETTING BACKGROUND IMAGE

BACKGROUND OF THE INVENTION

1. Field of the Invention

The present invention relates to a background image setting method and a background image setting apparatus for setting a color and a pattern used in a background of a photograph album in which images obtained by a digital camera or the like are laid out. The present invention also relates to a computer-readable recording medium storing a program that causes a computer to execute the background image setting method.

2. Description of the Related Art

There have been known systems for reproducing image data by using an output device such as a printer or a monitor. The image data for such a system are obtained by an imaging device such as a digital camera and a digital camcorder, or obtained by reading an image or images recorded on a photographic film with a scanner. Images represented by the image data are not only reproduced but also arranged in a desired layout for generating a photograph album. Such an album may be printed or displayed on a monitor.

Meanwhile, human vision is influenced strongly by a background color. Therefore, when two identical color charts are viewed with different background colors, colors in the charts are recognized as different colors. For this reason, a method has been proposed for changing a background color for an image to be displayed on a monitor (Japanese Unexamined Patent Publication No. 10 (1998)-145582). In this method, when an image to be printed is displayed on a monitor for confirmation of a finish thereof, a color of a background for the image is changed based on a color of a background for the print and on information regarding a light in which the print is viewed. In this manner, the image displayed on the monitor looks the same as the print viewed in the background color in the light.

A color of a background of a photograph album is generally white or a pale color such as beige. Since an image looks different in different background colors as has been described above, it can be thought that there is a more preferable background color for images to be laid out in a photograph album. Furthermore, a pattern in the background also causes the images in the album to look different.

SUMMARY OF THE INVENTION

The present invention has been conceived based on consideration of the above circumstances. An object of the present invention is therefore to provide a background image setting method and a background image setting apparatus enabling setting of a background image in accordance with an image or images tobe laid out thereon, and to provide a computer-readable recording medium storing a program that causes a computer to execute the background image setting method.

A background image setting method of the present invention is a method of setting a background image for laying out thereon an image represented by image data, and the background image setting method comprises the step of:

setting the background image based on information regarding the image.

A background image setting apparatus of the present invention is an apparatus for setting a background image for laying out thereon an image represented by image data, and the background image setting apparatus comprises:

background image setting means for setting the background image based on information regarding the image.

Only one image or a plurality of images may be laid out as the image to be laid out in the background image setting method or by the background image setting apparatus of the present invention. The image data may be obtained by a digital camera or by reading an image or images recorded on a photographic film with a scanner. The image data may be still-image data or moving-image data.

"Setting the background image" refers to setting a color and/or a pattern of the background. The background image may be a still image or a moving image.

In the background image setting method and the background image setting apparatus of the present invention, the information regarding the image may be information representing a color analysis result for the image data.

In the case where the image data comprises a plurality of image data sets, it is preferable for the color analysis result to be a color analysis result for all the image data sets.

The information regarding the color analysis result may be generated based on a ratio of an area of a hue having a predetermined value or more to an entire area in the image or in each of the images to be laid out.

The information regarding the image may be information on the time and/or a location of obtaining the image or the images.

As the "information regarding the time of obtaining the image or the images", information regarding the time described in tag information of the image data may be used in the case where the image data have been obtained by a digital camera. In the case where the image data have been obtained by reading an image or images recorded on a photographic film, information indicating the time of requesting the reading (such as the time of requesting printing of the image or the images recorded on the film) is added to the image data, and the information is used as the information indicating the time of obtaining the image. Furthermore, in the case of moving-image data, the time of generation of a file of the moving-image data is used. The time of obtaining the image or the images may be input manually from input means such as a keyboard at the time of setting the background image.

The "information on the location" refers to information indicating a location in which the image or the images were obtained. For example, in the case where photography is carried out at a beach or in a ski resort, character information such as "sea" or "ski resort" may be used as the information on location, and the information is added to the image data. Some models of digital camera add GPS information representing a location of photography to image data. The GPS information added to the image data may be used as the information on location. Furthermore, a country, an area, the weather, or the like in which the image or the images were obtained may be found based on the GPS information. In this manner, a pattern of the background image in accordance with the country, the area, or the weather, such as a national flag, a palm tree, a jungle, or a wild animal, can be used. The information on location maybe input manually from the input means at the time of setting the background image.

The information regarding the image may be information indicating the weather at the time of obtaining the image or the images.

The "information indicating the weather" may be added to the image data as character information representing the weather. Alternatively, the weather information may be obtained based on the information regarding the time and location. In this manner, the weather information can be used. The weather information may be input manually from the input means at the time of setting the background image.

The information regarding the image may be information representing a season in which the image or the images were obtained.

Furthermore, the information regarding the image may be information representing an impression of the image or the images.

In the case of moving-image data, the information regarding the image may be information representing a characteristic of a scene in a moving image represented by the moving-image data. In this case, the background image may be set in accordance with the scene in the moving image, based on the information representing the characteristic of the scene.

The background image setting method of the present invention may be provided as a program recorded in a computer-readable recording medium that causes a computer to execute the method.

According to the present invention, a background image for laying out an image is set based on information regarding the image. Therefore, the background image can be set appropriately in accordance with the image tobe laid out thereon. As a result, a photograph album giving a preferable impression can be generated.

DESCRIPTION OF THE PREFERRED EMBODIMENTS

Hereinafter, embodiments of the present invention will be explained with reference to the accompanying drawings.

Figure 1:
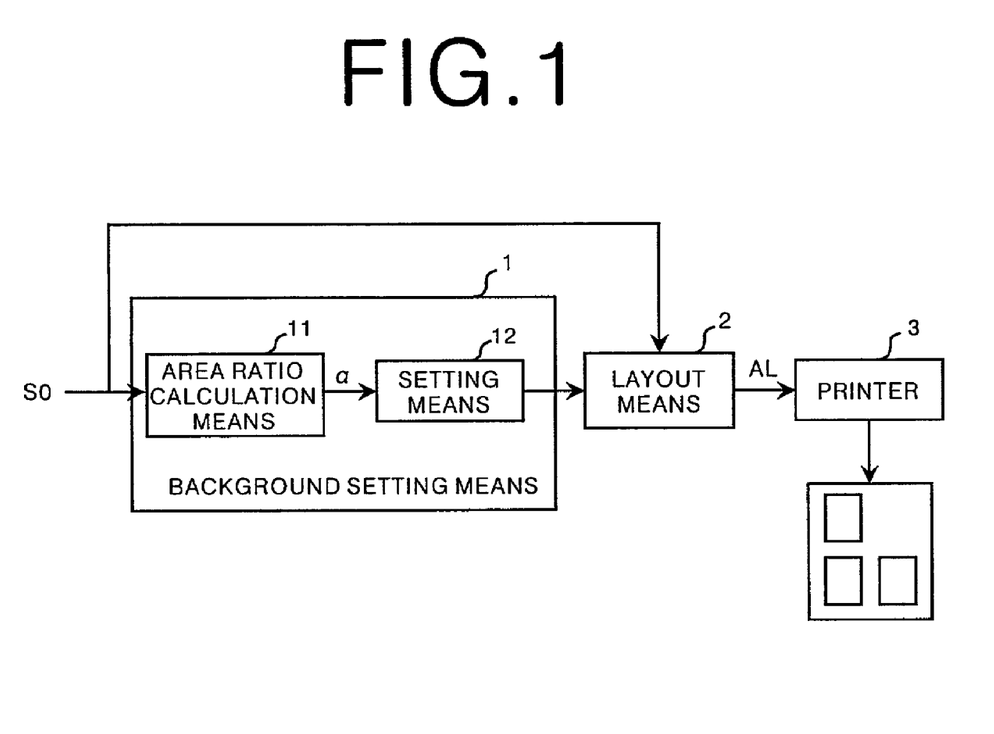
FIG. 1 is a block diagram showing a configuration of a photograph album generation apparatus comprising a background image setting apparatus of a first embodiment of the present invention.

FIG. 1 is a block diagram showing a configuration of a photograph album generation apparatus comprising a background image setting apparatus of a first embodiment of the present invention. As shown in FIG. 1, the photograph album generation apparatus in the first embodiment generates a photograph album by laying out images represented by image data sets S0 obtained by a digital camera. The photograph album generation apparatus comprises background setting means for setting a color of a background of the photograph album based on the image data sets S0, layout means 2 for obtaining album data AL by laying out the images represented by the image data sets S0 on the background having the color set by the background setting means 1, and a printer 3 for printing the album data AL.

The background setting means 1 comprises area ratio calculation means 11 for calculating a ratio $\alpha$ of a bright-hue area included in each of the images represented by the image data sets S0 to an entire area of the image, and setting means 12 for setting the background color based on the area ratio $\alpha$ calculated by the area ratio calculation means 11.

The area ratio $\alpha$ is calculated by the area ratio calculation means 11 in the following manner. If the image data sets S0 are based on ITU-R BT.709 (REC.709), color data R0, G0, B0 comprising each of the image data sets S0 are converted into CIE1931 tristimulus values X, Y, and Z according to Equations (1) to (3) below:

$$Pr=R0/255$$

$$Pg=G0/255$$

$$Pb=B0/255 \quad (1)$$

$$R0'=((Pr+0.099)/1.099)^{2.222}$$

$$G0'=((Pg+0.099)/1.099)^{2.222} \text{ (if } Pr, Pg, Pb \geq 0.081)$$

$$B0'=((Pb+0.099)/1.099)^{2.222} \quad (2)$$

$$R0'=Pr/4.5$$

$$G0'=Pg/4.5$$

$$B0'=Pb/4.5 \quad (2')$$

$$\begin{array}{c} X \; R0' \\ Y=|A|\square G0' \\ Z \; B0' \end{array} \quad (3)$$

where the matrix |A| is a matrix for converting the color data R0', G0', and B0' into the tristimulus values X, Y, and Z, and values below can be used therefor, for example.

$$|A|=\begin{array}{ccc} 0.4124 & 0.3576 & 0.1805 \\ 0.2126 & 0.7152 & 0.0722 \\ 0.0193 & 0.1192 & 1.0571 \end{array} \quad (4)$$

The tristimulus values X, Y, and Z may alternatively be found by using a look-up table, instead of using the matrix |A|.

CIE1976 L*, chroma value C*, and a hue angle HA are then found by Equations (5) to (7) below:

$$a*=500\{f(X/Xn)-f(Y/Yn)\}$$

$$b*=200\{f(Y/Yn)-f(Z/Zn)\}$$

$$L*=116(Y/Yn)^{1/3}-16 \text{ (if } Y/Yn>0.008856)$$

$$L*=903.25(Y/Yn) \text{ (if } Y/Yn \leq 0.008856) \quad (5)$$

If $X/Xn, Y/Yn, Z/Zn > 0.008856$ $$f(a/an)=(a/an)^{1/3}(a=X, Y, Z)$$

If $X/Xn, Y/Yn, Z/Zn \leqq 0.008856$ $$f(a/an) = 7.787(a/an) + 16/116$$

Note that Xn, Yn, and Zn are tristimulus values for white, and can be substituted by tristimulus values corresponding to CIE-Db 65 (a light source whose color temperature is 6500 K).

$$C^* = (a^{*2} + b^{*2})^{1/2} \quad (6)$$

$$HA = \tan^{-1}(b^*/a^*) \quad (7)$$

In this embodiment, only the chroma value $C^*$ is used. Therefore, only the chroma value $C^*$ is found.

A quantity P1 of pixels having a predetermined chroma value greater than or equal to a threshold value Th1 is then found, and a ratio of P1 to a quantity P0 of all the pixels (P1/P0) is found as the area ratio $\alpha$. The area ratio $\alpha$ is found for the respective images represented by the image data sets S0 used for generating the photograph album.

Since a center area of each of the images generally attracts the most attention, the area ratio $\alpha$ may be found based on an area of a predetermined range including the center area of each of the images.

The setting means 12 sets the background color in the following manner. First, the area ratio $\alpha$ is compared with a predetermined threshold value Th2 for all the images represented by the image data sets S0, and a quantity K1 of the images whose area ratio $\alpha$ is equal to or larger than Th2 is found. (Hereinafter, the image data sets corresponding to the images satisfying this condition are referred to as the image data sets S1). A ratio $\gamma$ of k1 to a quantity k0 of all the image data sets S0 is then found, and compared with a threshold value Th3. If $\gamma < Th3$, the images are judged to be basically grayish. Therefore, the background color is set to white or beige. In order to cause the images to stand out better, the background color may be non-white.

Figure 2:
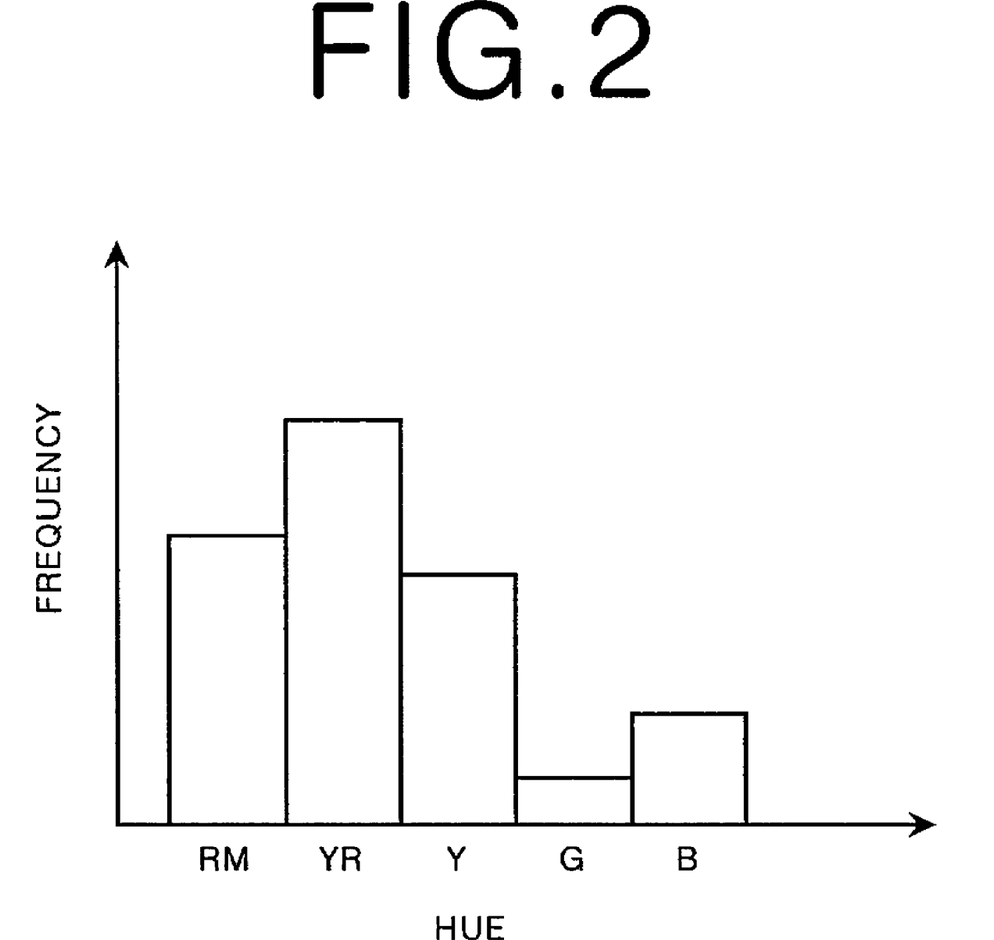
FIG. 2 is a diagram showing a hue histogram.

If $\gamma \geqq Th3$, frequency of pixels of each hue classified in advance is found for all the image data sets S1 that satisfy a condition $\alpha \geqq Th2$, and a hue histogram is generated. In this embodiment, as shown in FIG. 2, the hue histogram is generated for RM (Red Magenta), YR (Yellow Red), Y (Yellow), G (Green), and CB (Cyan Blue). The background color is set based on the hue whose frequency is the largest in the hue histogram. The background color corresponding to each of the hues is set in advance. For example, a pale light color having the same color as the hue appearing with the largest frequency is set in order to coordinate the images to be laid out with the background color. In the case where the hue histogram is as shown in FIG. 2, the hue appearing with the largest frequency is YR. Therefore, a pale yellow red is used as the background color.

Figure 3:
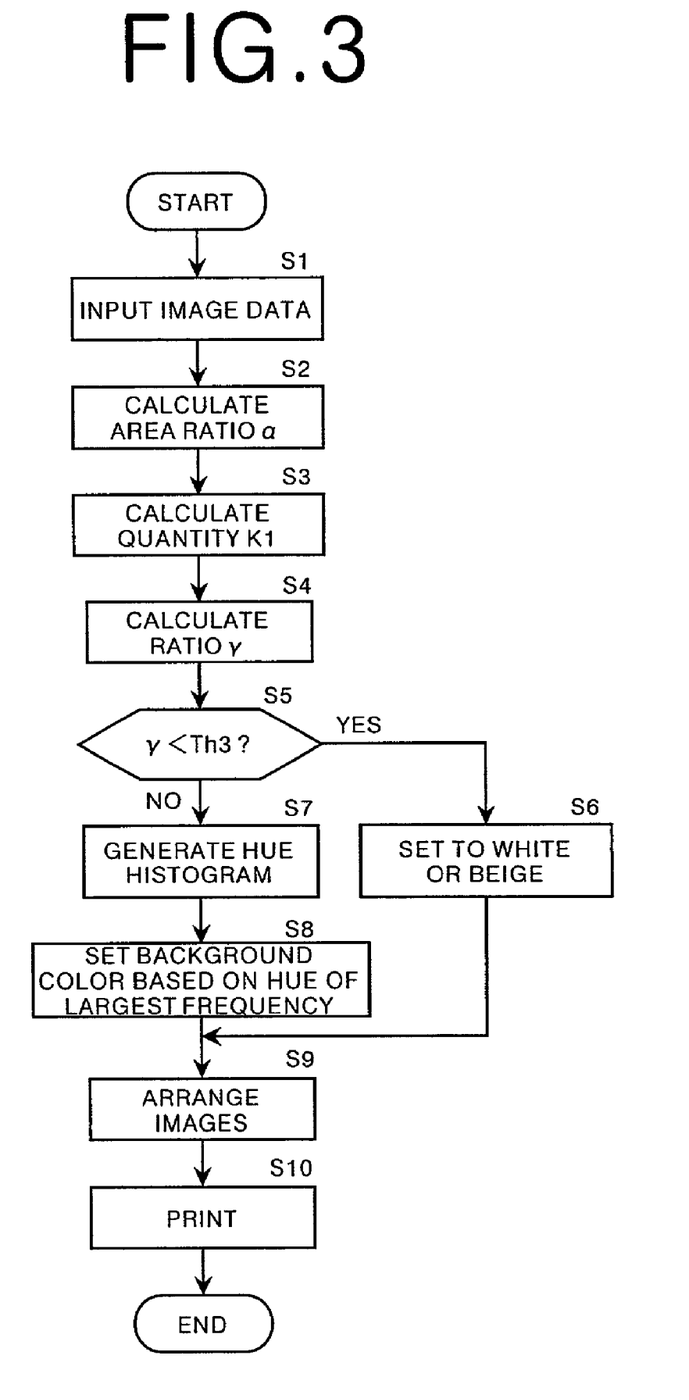
FIG. 3 is a flow chart showing operation of the first embodiment.

Operation of the first embodiment will be explained next. FIG. 3 is a flow chart showing a procedure carried out in the first embodiment. The image data sets S0 obtained by the digital camera for photograph album compilation are input to the background setting means 1 (Step S1). The area ratio calculation means 11 calculates the area ratio $\alpha$ of the quantity P1 of the pixels each having the chroma value $C^*$ satisfying the condition $C^* \geqq Th1$ to the quantity P0 of all the pixels, for each of the image data sets S0 (Step S2). The setting means 12 finds the quantity K1 of the image data sets S1 having the area ratio $\alpha$ equal to or larger than the predetermined threshold value Th2 (Step S3). The setting means 12 then finds the ratio $\gamma$ of the quantity K1 to the quantity K0 of all the image data sets S0 (Step S4).

Whether or not the ratio $\gamma$ is smaller than the threshold value Th3 is then judged (Step S5). If a result at Step S5 is affirmative, the background color is set to white or beige (Step S6). If the result at Step S5 is negative, the hue histogram is generated for all the image data sets S1 whose area ratio $\alpha$ is equal to or larger than the threshold value Th2 (Step S7). The background color is then set based on the hue having the largest frequency in the hue histogram (Step S8).

When the background color is set, the layout means 2 arranges the images represented by the image data sets S0 on the background having the color set by the background setting means 1. In this manner, the album data AL are generated (Step S9). The printer 3 outputs images represented by the album data AL. In this manner, the photograph album is generated (Step S10) and the procedure ends.

As has been described above, according to the present invention, the ratio $\gamma$ of the quantity K1 of the image data sets S1 each having the area ratio $\alpha \geqq Th2$ to the quantity K0 of all the image data sets S0 is calculated. If the ratio $\gamma$ is smaller than the threshold value Th3, the images are judged to be grayish and the background color is set to white or beige. If the ratio $\gamma$ is equal to or larger than the threshold value Th3, the hue histogram is generated. The background color is then set based on the hue appearing with the largest frequency in the hue histogram, in order to coordinate the images in the photograph album with the background color. Therefore, the background color can set for the images laidout in the photograph album, and the photograph album creates a preferable impression.

Figure 4:
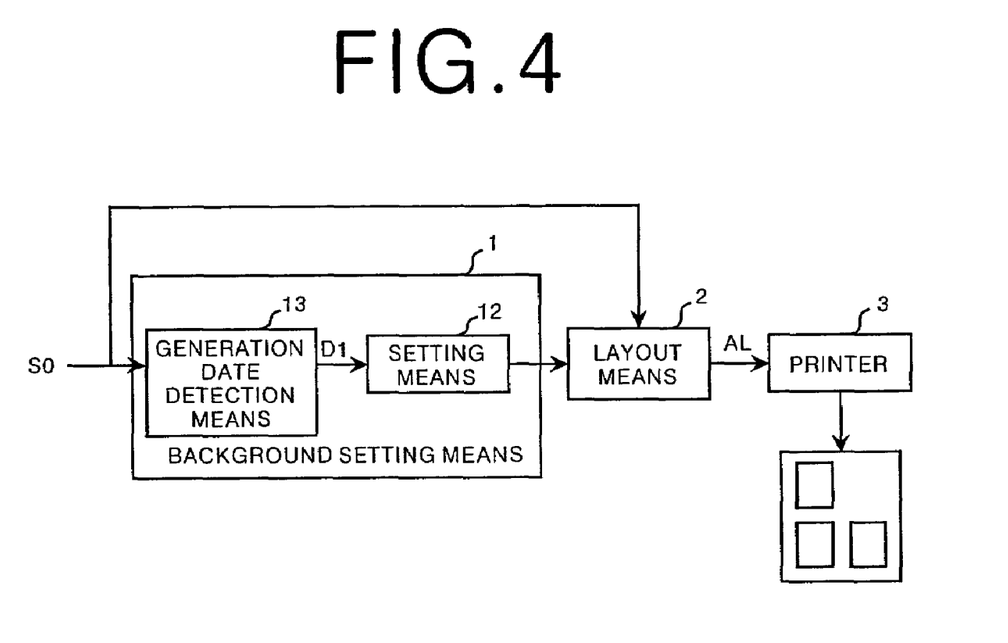
FIG. 4 is a block diagram showing a configuration of a photograph album generation apparatus comprising a background image setting apparatus of a second embodiment of the present invention.

Operation of a second embodiment of the present invention will be explained next. FIG. 4 is a block diagram showing a configuration of a photograph album generation apparatus comprising a background image setting apparatus of the second embodiment of the present invention. In the second embodiment, the same elements as in the first embodiment have the same reference numbers, and detailed explanation thereof is omitted. In the second embodiment, a background color is set based on the date of generation of image data sets S0. For this reason, generation date detection means 13 for detecting information D1 representing the date of obtaining the image data sets S0 is used in the second embodiment, instead of the area ratio calculation means 11 in the first embodiment.

In the case where the image data sets S0 have been obtained by a digital camera, information on the date of photography is added to the image data sets S0 as tag information thereof. Therefore, in this case, the information on the date of photography added as the tag information to the image data sets S0 is detected by the generation date detection means 13 as the generation date information D1. Meanwhile, in the case where the image data sets S0 have been obtained by reading images recorded on a photographic film, information on the date of reading or the date of requesting album generation is added to the image data sets S0 as tag information thereof. In this manner, the information indicating the date of reading or the date of request is detected by the generation date detection means 13 as the generation date information D1.

Setting means 12 judges the season of the date of generation of the image data sets S0, based on the generation date information D1 of the image data sets S0, and sets the background color in accordance with the season. For example, if the season is spring, the background color is set to pink to give the impression of cherry blossoms. The background color is set to yellow symbolizing sunflowers if the season is summer. The background color is set to orange or light blue for autumn or winter, symbolizing autumnal foliage or snow, respectively.

Instead of setting the background color, a pattern of the background may be set. For example, if the season is spring, a pattern of cherry blossoms may be used. Furthermore, a pattern of sunflowers, autumnal foliage, or snowmen can be adopted for summer, autumn, or winter, respectively. In order to cause images to stand out better, a pale light color is preferably used as the background color.

The information D1 indicating the date of generation is added to the respective image data sets S0. Since the images to be used for photograph album generation are generally obtained at approximately the same time, the generation date information D1 may be detected for only one of the image data sets S0 to be used for the photograph album generation. Alternatively, the generation date information D1 may be obtained for any arbitrary number of the image data sets S0 or for all the image data sets S0 so that the background color can be set based on the date of generation detected most frequently. Furthermore, the background color may be set for each of pages in which the images obtained on the same date are laid out.

Figure 5:
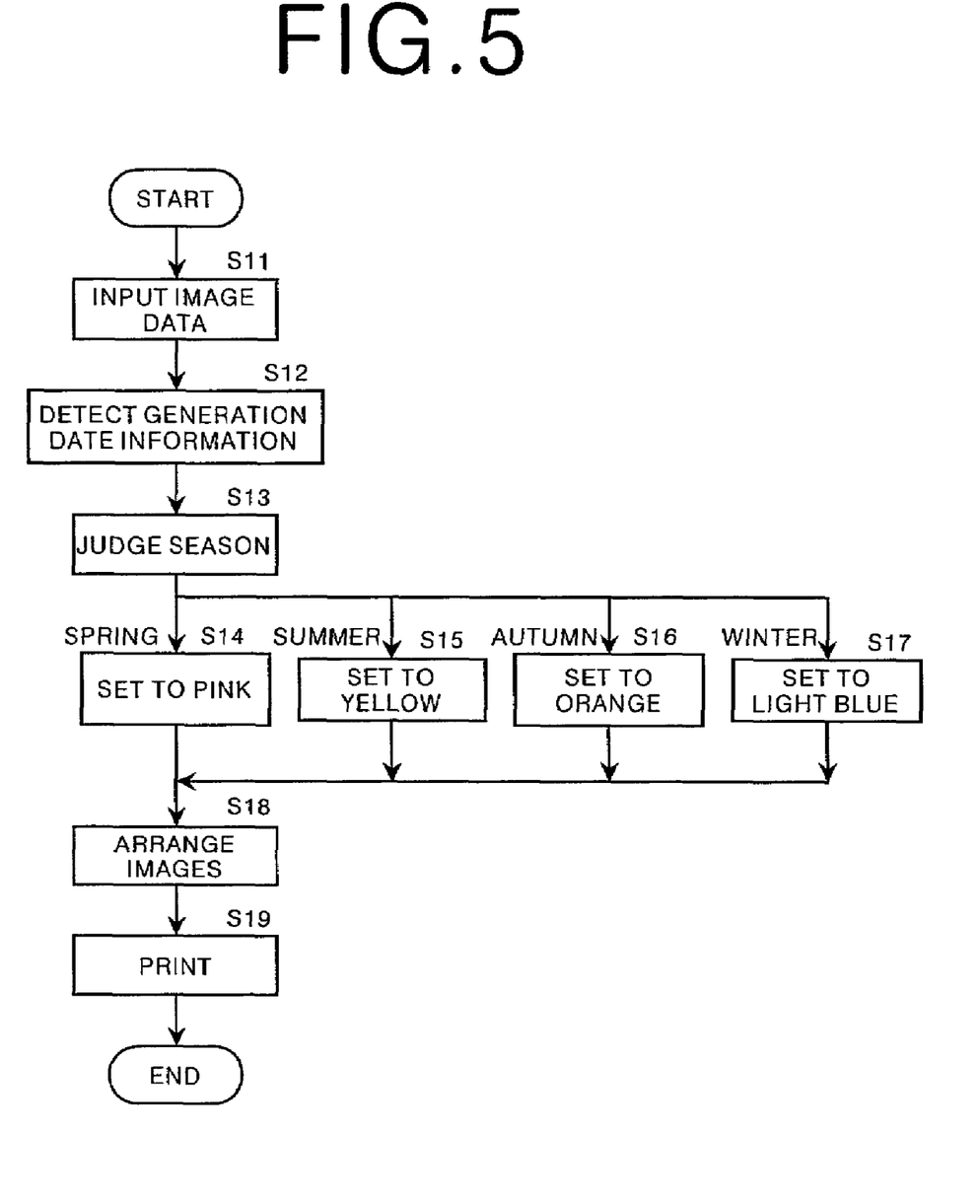
FIG. 5 is a flow chart showing operation of the second embodiment.

Operation of the second embodiment will be explained next. FIG. 5 is a flow chart showing a procedure carried out in the second embodiment. As in the first embodiment, the image data sets S0 obtained by the digital camera for photograph album generation are input to background setting means 1 (Step S11). The generation date detection means 13 detects the information on the date of photography added to the image data sets S0 as the generation date information D1 (Step S12). The season in which the photography was carried out is then judged based on the generation date information D1 (Step S13). If the season is spring, the background color is set to pink (Step S14). If the season is summer, the background color is set to yellow (Step S15). If the season is autumn, the background color is set to orange (Step S16). If the season is winter, the background color is set to light blue (Step S17).

After the background color has been set, layout means 2 arranges the images represented by the image data sets S0 on the background having the color that has been set. In this manner, album data AL are obtained (Step S18). A printer 3 prints images represented by the album data AL. In this manner, the photograph album is generated (Step S19) to end the procedure.

In the second embodiment, the season is judged based on the date of generation added to the image data sets S0. However, information on the season in which the image data sets S0 were obtained may be added as character information to the image data sets S0. In this manner, the setting means 12 can set the background color based on the information regarding the season.

Figure 6:
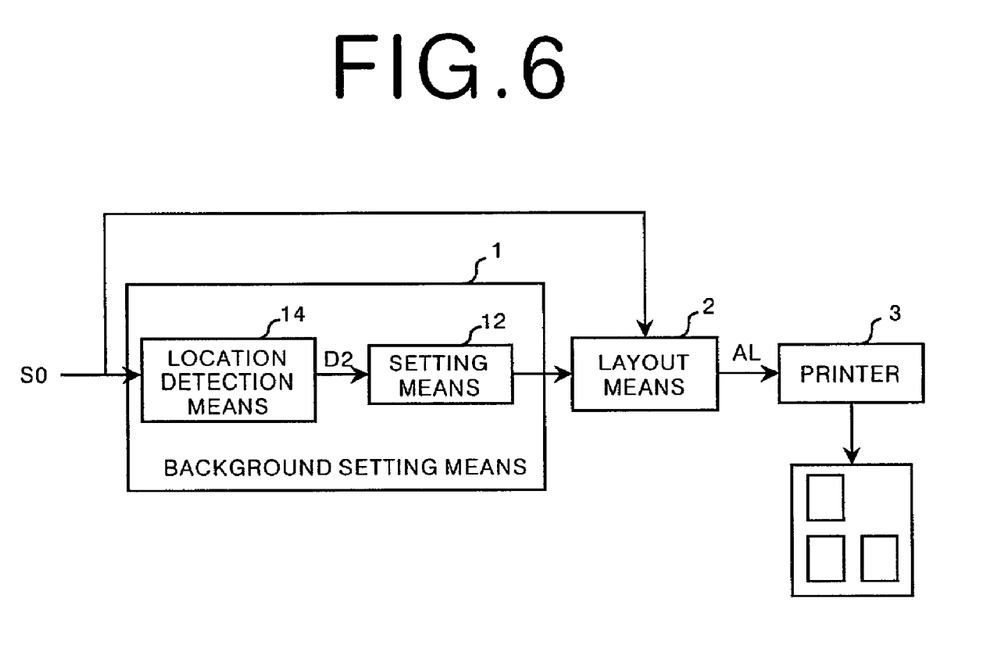
FIG. 6 is a block diagram showing a configuration of a photograph album generation apparatus comprising a background image setting apparatus of a third embodiment of the present invention.

A third embodiment of the present invention will be explained next. FIG. 6 is a block diagram showing a configuration of a photograph album generation apparatus comprising a background image setting apparatus of the third embodiment of the present invention. In the third embodiment, the same elements as in the first embodiment have the same reference numbers and detailed explanation thereof is omitted. In the third embodiment, a background color is set based on a location in which image data sets S0 were obtained. For this reason, location detection means 14 for detecting the location is used in the third embodiment, instead of the area ratio calculation means 11 in the first embodiment. In the case where a digital camera has a function of obtaining GPS information, the GPS information is added to the image data sets S0 as tag information thereof. Therefore, the location detection means 14 detects the GPS information added as the tag information to the image data sets S0 as information D2 representing the location. Meanwhile, in the case where the image data sets S0 have been obtained by reading images from a photographic film, the location is added as tag information to the image data sets S0 at the time of reading. In this manner, the information representing the location and added to the image data sets S0 is detected by the location detection means 14 as the location information D2. In this embodiment, the image data sets S0 have been obtained by a digital camera having the GPS function and the GPS information has been added to the image data sets S0.

Setting means 12 judges a country, an area, the weather, or the like of the location, based on the location information D2 detected by the location detection means 14, and sets the background color in accordance with the country, the area, or the weather. For example, if the image data sets S0 have been obtained in a country or area having hot weather, the background color is set to yellow symbolizing the hot weather. In the case of a cold country or area, the background color is set to light blue symbolizing coldness. Furthermore, a national flag of the country may be used as a pattern of the background. In the case of a hot country, a jungle or a wild animal therein may be used for the pattern, for example. In order to cause images in a photograph album to stand out better, a pale light color is preferably used as the background color. Moreover, the background color may be set for each page classified according to the location.

Figure 7:
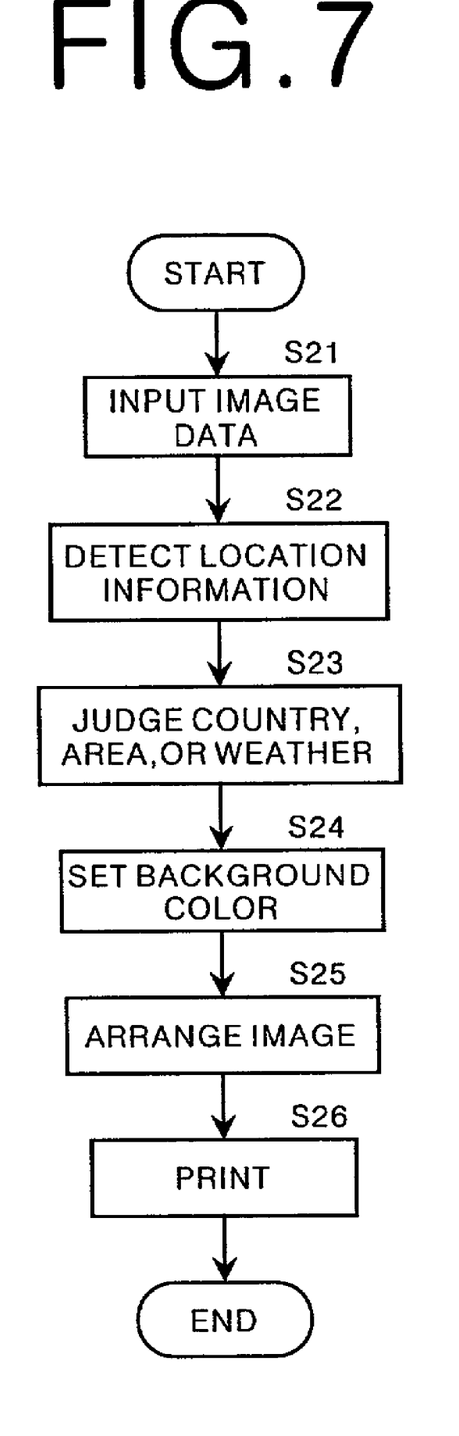
FIG. 7 is a flow chart showing operation of the third embodiment.

Operation of the third embodiment will be explained next. FIG. 7 is a flow chart showing a procedure carried out in the third embodiment. As in the first embodiment, the image data sets S0 obtained by the digital camera for photograph album generation are input to background setting means 1 (Step S21). The location detection means 14 detects the GPS information added to the image data sets S0 as the location information D2 (Step S22). The country, the area, or the weather is then judged based on the location information D2 (Step S23), and the background color is set in accordance with the country, the area, or the weather (Step S24).

After the background color has been set, layout means 2 arranges images represented by the image data sets S0 on the background having the color that has been set. In this manner, album data AL are obtained (Step S25). A printer 3 prints images represented by the album data AL. In this manner, the photograph album is generated (Step S26) to end the procedure.

In the second and third embodiments described above, the background color is set based on the information D1 or D2 representing the date of generation or the location. However, the background color may be set based on the information D1 and D2 representing both the date of generation and the location. For example, weather information regarding the weather at the time of acquiring the image data sets S0 may be obtained based on the information D1 and D2 representing the date of generation and the location so that the background color can be set in accordance with the weather at the time of photography. In this case, in order to create an atmosphere at the time of photography, the background color is set to light YR in the case of fine weather while the background color is set to gray in the case of cloudy or rainy weather.

Information representing the weather at the time of photography may be added to the image data sets S0. In this case, the weather information added to the image data sets S0 is detected, and the setting means 12 sets the background color based on the information representing the weather.

In the third embodiment, the country, the area, or the weather is judged based on the GPS information added to the image data sets S0. However, information representing the country, the area, or the weather at the time of photography may be added as character information to the image data sets S0. In this case, the character information representing the country, the area, or the weather and added to the image data sets S0 is detected, and the setting means 12 sets the background color based on the information on the country, the area, or the weather.

Figure 8:
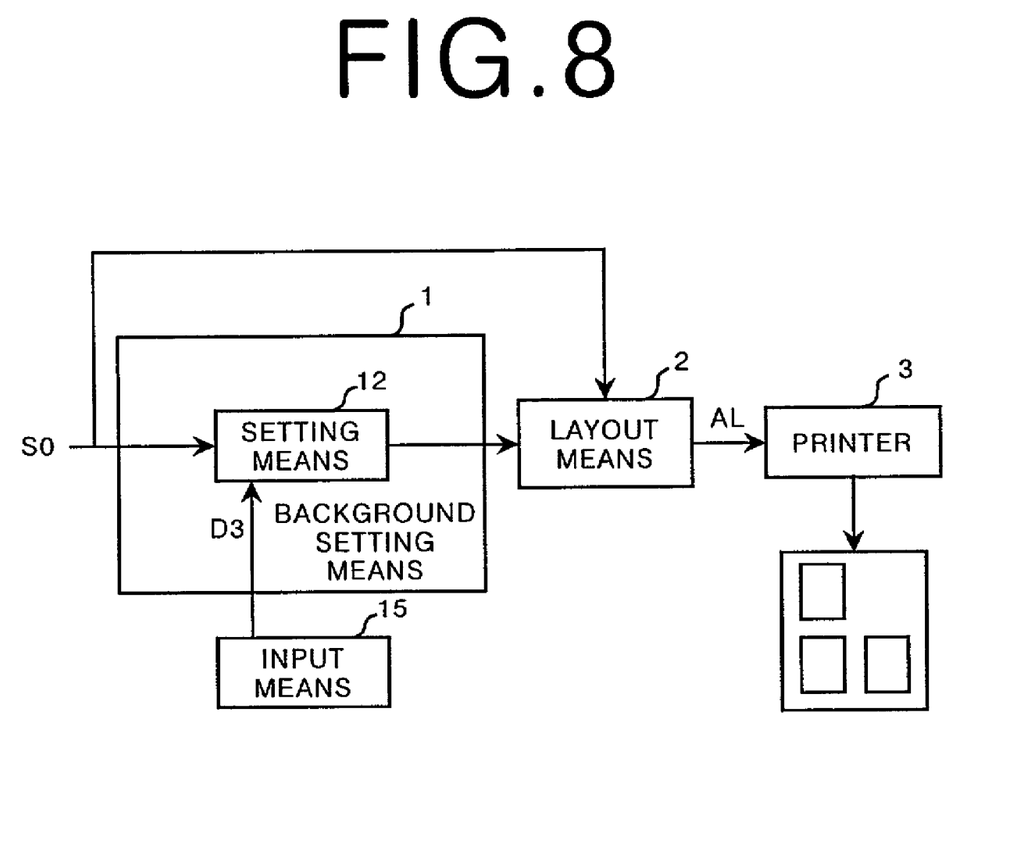
FIG. 8 is a block diagram showing a configuration of a photograph album generation apparatus comprising a background image setting apparatus of a fourth embodiment of the present invention.

A fourth embodiment of the present invention will be explained next. FIG. 8 is a block diagram showing a configuration of a photograph album generation apparatus comprising a background image setting apparatus of the fourth embodiment of the present invention. In the fourth embodiment, the same elements as in the first embodiment have the same reference numbers and detailed explanation thereof is omitted. In the fourth embodiment, setting means 12 comprises input means 15 for inputting an impression of images represented by the image data sets S0, and a background color is set based on information D3 representing the impression of the images.

The input means 15 preferably comprises a keyboard so that the impression such as "happy" or "sad" can be input by simply pressing a key related to the impression.

The setting means 12 sets the background color in accordance with the impression, based on the information D3 representing the impression input from the input means 15. For example, if the impression that has been input is "happy", a warm color such as YR, R, and Y is used. If the impression is "sad", a cool color such as C (Cyan), CB, and B (Blue) can be used.

Instead of setting the background color, a pattern of the background may be set. For example, if the impression is "happy", a pattern implying a happy image is used. If the impression is "sad", a pattern implying a sad image is used.

Figure 9:
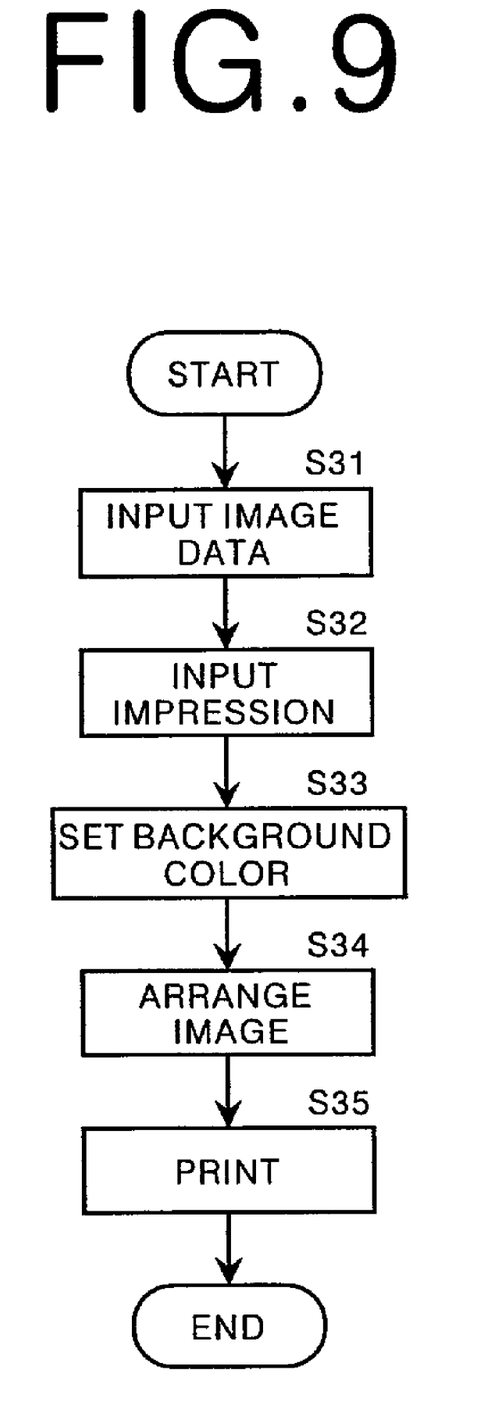
FIG. 9 is a flow chart showing operation of the fourth embodiment.

Operation of the fourth embodiment will be explained next. FIG. 9 is a flow chart showing a procedure carried out in the fourth embodiment. The image data sets S0 obtained by a digital camera for photograph album compilation are input to background setting means 1 (Step S31), as in the first embodiment. The impression input from the input means 15 is then received (Step S32). The background color is set based on the information D3 representing the impression (Step S33).

After the background color has been set, layout means 2 arranges the images represented by the image data sets S0 on the background having the color that has been set. In this manner, album data AL are obtained (Step S34). A printer 3 prints images represented by the album data AL. In this manner, a photograph album is generated (Step S35) to end the procedure.

In the fourth embodiment, the impression of the images represented by the image data sets S0 is input, and the background color is set in accordance with the impression. However, a location in which the image data sets S0 have been obtained may be input from the input means 15 so that the background color can be set based on the location. In this case, the input means 15 comprises the keyboard and it is preferable for the location to be input by simply pressing a key that are related to the location such as "sea", "mountains in summer", "ski resort" or "party", for example. The setting means 12 sets the background color in accordance with the location that has been input. For example, if "sea" is input as the location, the background color is set to bluish. In the case of "mountains in summer", a greenish color is set as the background color. In the case of "ski resort" or "party", a whitish color or orange is set as the background color, respectively. Instead of setting the background color, a pattern representing the location may be used. Furthermore, in order to cause the images in the album to stand out better, the background color is preferably set to a pale light color. Moreover, the date of photography and the season may be input from the input means 15 so that the background color can be set based on information representing the date of photography or season.

In the third embodiment, the GPS information is added to the image data sets S0 as the location information D2. However, instead of the GPS information, character information such as "sea" or "mountains in summer" may be added to the image data sets S0 as the location information. In this case, the background color is set as in the case of inputting the location information from the input means 15 in the fourth embodiment, based on the location information added to the image data sets S0.

In the first to fourth embodiments described above, the background color is set based on the image data sets S0. In the case where only one image is laid out, the background color is set based on an image data set S0 representing the image.

In the first to fourth embodiments described above, the photograph album is compiled by using still images. In the case of inserting a moving image in an electronic photograph album in a Web page or the like, a background color for the moving image is set in accordance with a color in the moving image, the date of photography, a location of photography, and an impression of the moving image, for example. In this case, a background image may be changed in accordance with a characteristic of a scene in the moving image. For example, in the case of a video image representing a school play, the background color is set to grayish for scenes in which the child of the photographer is not shown. For scenes in which the child appears, the background color is set to a warm color. In this manner, the moving image can attract attention.

In the first to fourth embodiments described above, the background color or the background pattern is set in accordance with the images tobe laid out in the photograph album. However, the background image can be a moving image in accordance with the images to be laid out.

The album data AL are printed from the printer 3 in the first to fourth embodiments. However, the album data AL may be displayed on a monitor as an electronic photograph album.

What is claimed is:

1. A background image setting method for setting a background image for laying out thereon a first image represented by image data, the background image setting method comprising the step of:

setting the background image based on information regarding the first image, wherein the information is obtained from the entire first image, the information regarding the first image is information representing a color analysis result for the image data, wherein in the case where the image data comprises a plurality of image data sets, the color analysis result is a color analysis result for all the image data sets, wherein the information representing the color analysis result is generated based on a ratio of an area of a hue having a predetermined value or more to an entire area in the first image or in each of images represented by the image data sets, wherein the predetermined value or more is not determined by analyzing the first image using image processing.

2. A background image setting method as defined in claim 1, wherein the information regarding the first image is information representing the weather at the time of obtaining the first image.

3. A background image setting method as defined in claim 1, wherein the information regarding the first image is information representing a season in which the first image was obtained.

4. A background image setting method as defined in claim 1, wherein the information regarding the first image is information representing an impression of the first image.

5. A background image setting method as defined in claim 1, the information regarding the first image being information representing a characteristic of a scene in a moving image if the moving image is used as the first image to be laid out, and the background image being set in accordance with the scene in the moving image, based on the information representing the characteristic of the scene in the moving image.

6. A background image setting apparatus for setting a background image for laying out thereon a first image represented by image data, the background image setting apparatus comprising:

background image setting means for setting the background image based on information regarding the first image, wherein said information is obtained from the entire first image, the information regarding the first image is information representing a color analysis result for the image data, wherein in the case where the image data comprises a plurality of image data sets, the color analysis result is a color analysis result for all the image data sets, wherein the information representing the color analysis result is generated based on a ratio of an area of a hue having a predetermined value or more to an entire area in the first image or in each of images represented by the image data sets, wherein the predetermined value or more is not determined by analyzing the first image using image processing.

7. A background image setting apparatus as defined in claim 6, wherein the information regarding the first image is information representing the weather at the time of obtaining the first image.

8. A background image setting apparatus as defined in claim 6, wherein the information regarding the first image is information representing a season in which the first image was obtained.

9. A background image setting apparatus as defined in claim 6, wherein the information regarding the first image is information representing an impression of the first image.

10. A background image setting apparatus as defined in claim 6, the information regarding the first image being information representing a characteristic of a scene in a moving image if the moving image is used as the first image to be laid out, and the background image setting means setting the background image in accordance with the scene in the moving image, based on the information representing the characteristic of the scene in the moving image.

* * * * *